US010485280B1

(12) United States Patent
DePriest et al.

(10) Patent No.: US 10,485,280 B1
(45) Date of Patent: Nov. 26, 2019

(54) PROTECTIVE GLOVE

(71) Applicant: Refrigiwear, Inc., Dahlonega, GA (US)

(72) Inventors: Scotty E DePriest, Cumming, GA (US); Gary W Hensel, Cumming, GA (US)

(73) Assignee: Refrigiwear, Inc., Dahlonega, GA (US)

(*) Notice: Subject to any disclaimer, the term of this patent is extended or adjusted under 35 U.S.C. 154(b) by 269 days.

(21) Appl. No.: 15/700,235

(22) Filed: Sep. 11, 2017

Related U.S. Application Data

(60) Provisional application No. 62/395,541, filed on Sep. 16, 2016.

(51) Int. Cl.
*A41D 19/015* (2006.01)
*G06F 3/044* (2006.01)
*G06F 3/01* (2006.01)
*A41D 19/00* (2006.01)

(52) U.S. Cl.
CPC ... *A41D 19/01576* (2013.01); *A41D 19/0006* (2013.01); *G06F 3/014* (2013.01); *G06F 3/044* (2013.01)

(58) Field of Classification Search
CPC .......... A41D 19/01576; A41D 19/0006; G06F 3/014; G06F 3/044
USPC .............................................. 2/159, 160, 167
See application file for complete search history.

(56) References Cited

U.S. PATENT DOCUMENTS

| | | | |
|---|---|---|---|
| 2,018,442 A * | 10/1935 | Elkus | A41D 19/01576 2/161.6 |
| 3,132,348 A | 5/1964 | Frenkel et al. | |
| 6,052,829 A * | 4/2000 | Kindler | A41D 19/01505 2/16 |
| 6,094,748 A * | 8/2000 | Kindler | A41D 19/01576 2/16 |
| 6,128,004 A | 10/2000 | McDowall et al. | |
| 6,141,643 A | 10/2000 | Harmon | |
| 7,365,031 B2 | 4/2008 | Swallow et al. | |
| 7,874,021 B2 | 1/2011 | Sunder et al. | |
| 7,895,669 B2 | 3/2011 | Kleinert | |
| 8,276,215 B2 | 10/2012 | Merkle et al. | |
| 8,336,119 B2 * | 12/2012 | Phelps | A41D 19/0024 2/159 |
| 8,400,256 B2 | 3/2013 | Matthews | |
| 8,528,117 B2 * | 9/2013 | Asiaghi | G06F 3/014 2/159 |

(Continued)

FOREIGN PATENT DOCUMENTS

EP 2620842 A1 7/2013
JP 2015-014064 A 1/2015

OTHER PUBLICATIONS

Olympia Gloves, Olympia 730 Touch Screen Gloves, Olympia Gloves Website, shop.olympiagloves.com/products/730-touch-screen, 2016, Elmsford, New York.

(Continued)

*Primary Examiner* — Gloria M Hale
(74) *Attorney, Agent, or Firm* — The Sladkus Law Group

(57) ABSTRACT

A protective glove for use with a keyboard, keypad, touchscreen or other electrical or mechanical user interfaces is encompassed by the present disclosure. The protective glove can comprise a plurality of insulative layers and one or more nibs formed on or mounted to the protective glove, wherein the nib is in electrical communication with one or more of the layers of the glove body.

19 Claims, 10 Drawing Sheets

(56) References Cited

U.S. PATENT DOCUMENTS

| | | | |
|---|---|---|---|
| 8,605,049 B2 | 12/2013 | Spencer | |
| 8,739,315 B2 * | 6/2014 | Baacke | A41D 1/005 2/160 |
| 9,051,621 B2 | 6/2015 | Leto | |
| 9,298,326 B2 | 3/2016 | Spencer | |
| 2001/0049839 A1 * | 12/2001 | Kindler | A41D 19/01505 2/167 |
| 2005/0231471 A1 | 10/2005 | Mallard et al. | |
| 2005/0282009 A1 | 12/2005 | Nusko et al. | |
| 2007/0245454 A1 | 10/2007 | Eklund | |
| 2009/0049582 A1 | 2/2009 | Zawadzki et al. | |
| 2009/0066658 A1 | 3/2009 | Earl | |
| 2009/0089915 A1 * | 4/2009 | Franke | A41D 19/0006 2/161.8 |
| 2009/0183297 A1 | 7/2009 | Drosihn | |
| 2010/0090966 A1 | 4/2010 | Gregorio | |
| 2011/0047672 A1 | 3/2011 | Hatfield | |
| 2011/0265245 A1 | 11/2011 | Asiaghi | |
| 2012/0128995 A1 | 5/2012 | Leto et al. | |
| 2012/0324620 A1 * | 12/2012 | Murphy | G06F 3/039 2/159 |
| 2013/0027362 A1 | 1/2013 | Lee et al. | |
| 2013/0086730 A1 | 4/2013 | Wilkening et al. | |
| 2013/0127791 A1 * | 5/2013 | Siuta | G06F 3/03545 345/179 |
| 2013/0168222 A1 | 7/2013 | Ning | |
| 2013/0263354 A1 * | 10/2013 | Gibby | A63B 71/14 2/161.1 |
| 2014/0033396 A1 | 2/2014 | Hatfield et al. | |
| 2014/0157486 A1 | 6/2014 | Audibert et al. | |
| 2014/0189932 A1 * | 7/2014 | Joffe | A41D 19/0024 2/160 |
| 2016/0016065 A1 * | 1/2016 | Tan | A63B 71/146 2/161.2 |
| 2016/0124508 A1 | 5/2016 | Williams et al. | |

OTHER PUBLICATIONS

Virtual Riding TV, Reviews Alpinestars Overland Drystar® Motorcycle Gloves, vridetv.com/alpinestarsdrystargloves.html, 2016, Canada.

Ebikeshoes, Andyshi® Mens Winter Outdoor Cycling Glove Touchscreen Gloves for Smart Phone From Andyshi®, http://ebikeshoes.com/store/, 2016.

Rideapart, Best Touchscreen Motorcycle Gloves, rideapart.com/articles/best-touchscreen-motorcycle-gloves, 2014, Detroit, Michigan.

Glider Gloves, Winter Style Touchscreen Gloves, www.glidergloves.com, 2016, Ontario Canada.

Glider Gloves, Winter Style Touchscreen Gloves (Light Grey), www.glidergloves.com, 2016, Ontario Canada.

Hunters Logic LLC, The Glove Nib, hunterslogic.com/products/the-glove-nib, 2016.

GloveTips, LLC, GloveTips, glovetips.com, 2016, Lakewood, Ohio.

Summit Safety LLC, Hivisibility Flex Grip Work Gloves With Touch Screen Fingertips, www.hivissupply.com/hivisibility-flex-grip-glove-with-touch-screen-fingertips.html, 2016, Brooksville, Florida.

R&R Associates LLC, Stylus for Your Gloves, www.mrassociates.com/wordpress/digits/?post_in_lightbox=1&iframe=true&width=700&height=90%, 2012, Sarasota, Florida.

Pearl Izumi, Men's Thermal Conductive Glove, www.pearlizumi.com/us/en/Shop/Ride/Road/Men%27s/essentials/gloves/Men%27s_Thermal_Conductive_Glove/p/14141311428, 2016.

Thumbsup! (UK) Ltd., Finger Stylus, thumbsupuk.com, 2016.

Geekalerts, Touchscreen Sport Gloves, www.geekalerts.com/touchscreen-sport-gloves/, 2011.

\* cited by examiner

PROTECTIVE GLOVE

RELATED APPLICATION

This application claims the benefit of priority to U.S. Provisional Application No. 62/395,541, filed Sep. 16, 2016. The provisional application identified above is hereby incorporated by reference in its entirety herein to provide continuity of disclosure.

TECHNICAL FIELD

The present disclosure is directed generally to protective gloves, and, more specifically, to protective gloves for use with electronic and mechanical devices.

BACKGROUND

In harsh environments, such as extreme cold, extreme heat, or exposure to impact or vibration, many users wear multi-layered protective gloves that are bulky and lower dexterity in the use of the wearer's fingers and thumb. Even in such harsh environments, many users still have the need to operate small keyboards, keypads, and/or capacitive touch screen devices as part of their job function or the activity in which they are engaged. With current protective gloves, this need to operate certain devices requiring dexterity often results in the removal of the protective glove in order to complete this function, exposing the hand to the very elements being protected by the glove. Consequently, there is a need for a glove that provides both protection from harsh environments and the ability to operate with dexterity certain devices, such as keyboards, keypads, and/or capacitive touch screens without the need to remove the glove.

SUMMARY

The present disclosure encompasses protective gloves that can be used with keyboards, keypads, touchscreens, and other machine user interfaces. The protective gloves encompassed by the present disclosure can comprise a plurality of insulative layers, with one or more layers of the glove being formed of an electrically conductive material. The protective gloves also comprise one or more nibs attached to the glove body. The nib comprises one or more electrically conductive materials and is in electrical communication with the one or more of the layers of the glove. The protective gloves encompassed by the present disclosure are configured to allow the nib to be in electrical communication with at least a portion of a hand disposed within the glove. The nib can be detachably connected to the glove body and removed and/or replaced as needed.

The present disclosure encompasses a protective glove comprising a palmar portion and a dorsal portion connected to the palmar portion, wherein the palmar portion and the dorsal portion cooperate to form a glove body, wherein the palmar portion and the dorsal portion cooperate to form an opening in the glove body for receiving a hand; a plurality of finger elements formed in the glove body, wherein the plurality of finger elements comprises an index finger element, a long finger element, a ring finger element, and a small finger element; a thumb element formed in the glove body, wherein each of the plurality of finger elements and the thumb element are configured to receive a finger of a hand disposed within the protective glove, wherein the glove body comprises an outer layer, an inner lining layer, and an insulative layer disposed between the outer layer and the inner lining layer, wherein the inner lining layer contacts a portion of the hand disposed within the protective glove; and, a nib attached to the glove body and extending beyond the outer layer, wherein the nib comprises an electrically conductive material, wherein the outer layer is electrically non-conductive, wherein the inner lining layer is electrically conductive, wherein the nib is in electrical communication with the inner lining layer and a portion of the hand contacting the inner lining layer. In one aspect, the protective glove further can comprise a nib receiver attached to the glove body, wherein the nib is detachably secured to the nib receiver. In another aspect, the insulative layer can be electrically conductive, and the insulative layer can be in electrical communication with the nib and the inner lining layer. In a further aspect, the insulative layer can be one insulative layer of a plurality of insulative layers disposed in the glove body between the outer layer and the inner lining layer. In still another aspect, the plurality of insulative layers can comprise an outer insulative layer and an outer fleece layer, the outer insulative layer and the outer fleece layer can be disposed between the insulative layer and the outer layer. In yet a further aspect, the plurality of insulative layers can be electrically conductive, and the plurality of insulative layers can be in electrical communication with the nib and the inner lining layer. In another aspect, the protective glove can comprise a plurality of protective members disposed on the glove body. In still another aspect, a protective member of the plurality of protective members can be disposed on the dorsal portion. In yet another aspect, the plurality of protective members can be disposed on the plurality of finger elements. In a further aspect, the nib can be disposed on the index finger element of the glove body. In a still further aspect, the nib can be disposed on a palmar side of the index finger element of the glove body. In another aspect, the protective glove further can comprise a plurality of nib receivers attached to the glove body. In still another aspect, the plurality of nib receivers can be disposed on the plurality of finger elements.

The present disclosure also encompasses a protective glove comprising a palmar portion and a dorsal portion connected to the palmar portion, wherein the palmar portion and the dorsal portion cooperate to form a glove body, wherein the palmar portion and the dorsal portion cooperate to form an opening in the glove body for receiving a hand; a plurality of finger elements formed in the glove body, wherein the plurality of finger elements comprises an index finger element, a long finger element, a ring finger element, and a small finger element; a thumb element formed in the glove body, wherein each of the plurality of finger elements and the thumb element are configured to receive a finger of the hand disposed within the protective glove, wherein the glove body comprises an outer layer, an inner lining layer, and a plurality of insulative layers disposed between the outer layer and the inner lining layer, wherein the inner lining layer contacts a portion of the hand disposed within the protective glove; and, a nib detachably connected to a nib receiver, wherein the nib receiver is attached to the glove body, wherein the nib extends beyond the outer layer, wherein the nib comprises an electrically conductive material, wherein the outer layer is electrically non-conductive, wherein the inner lining layer is electrically conductive, wherein the nib is in electrical communication with the inner lining layer and a portion of the hand contacting the inner lining layer. In another aspect, the plurality of insulative layers can be electrically conductive, and the plurality of insulative layers can be in electrical communication with the nib and the inner lining layer. In a further aspect, the protective glove further can comprise a plurality of protective members disposed on the dorsal portion of the glove body. In still another aspect, the plurality of protective members can be disposed on the plurality of finger elements. In still a further aspect, the nib can be disposed on the index finger element of the glove body. In another aspect, the nib can be disposed on a palmar side of the index finger element of the glove body. In still another aspect the nib receiver can be one nib receiver of a plurality of nib receivers disposed on the glove body. In a further aspect, the plurality of nib receivers can be disposed on the plurality of finger elements.

The present disclosure also encompasses a protective glove comprising a palmar portion and a dorsal portion connected to the palmar portion, wherein the palmar portion and the dorsal portion cooperate to form a glove body, wherein the palmar portion and the dorsal portion cooperate to form an opening in the glove body to receive a hand; a plurality of finger elements formed in the glove body, herein the plurality of finger elements comprises an index finger element, a long finger element, a ring finger element, and a small finger element; a thumb element formed in the glove body, wherein each of the plurality of finger elements and the thumb element are configured to receive a finger of the hand disposed within the protective glove, wherein the glove body comprises an outer layer, an inner lining layer, an outer insulative layer disposed adjacent the outer layer, an outer fleece layer disposed adjacent the outer insulative layer, and an inner insulative layer disposed between the outer fleece layer and the inner lining layer, wherein the inner lining layer contacts a portion of the hand disposed within the protective glove, wherein at least one of the outer insulative layer, the outer fleece layer, and the inner insulative layer are electrically conductive; a plurality of protective members disposed on the dorsal portion and the plurality of finger elements and the thumb element; and, a nib detachably connected to a nib receiver, wherein the nib receiver is attached to the index finger element of the glove body, wherein the nib extends beyond the outer layer, wherein the nib comprises an electrically conductive material, wherein the outer layer is electrically non-conductive, wherein the inner lining layer is electrically conductive, wherein the nib is in electrical communication with the inner lining layer, a portion of the hand contacting the inner lining layer, and at least one of the outer insulative layer, the outer fleece layer, and the inner insulative layer.

These and other aspects of the present disclosure are set forth in greater detail below and in the drawings for which a brief description is provided as follows.

DETAILED DESCRIPTION

The present disclosure encompasses gloves that include electrically conductive elements therein. The protective gloves described herein can be used to interface with a keyboard, keypad, touchscreen or other the user interface of a mechanical or electrical device requiring some manual precision in interfacing via contact with the device. The protective gloves encompassed by the present disclosure can provide protection to a user's hands against extreme temperatures and/or environments and/or crushing forces. Wherever possible, the application uses the same reference numbers throughout the drawings to refer to the same or similar items.

As used herein, the singular forms of "a," "an," and "the" encompasses the plural form thereof unless otherwise indicated. As used herein, the phrase "at least one" includes all numbers of one and greater. The ranges used herein include all values that would fall within the stated range, including values falling intermediate of whole values. As used herein, the term "and/or" refers to one or all of the listed elements or a combination of any two or more of the listed elements. As used herein, the term "electrically conductive" refers to the ability to conduct an electrical current. As used herein, the term "electrical communication" refers to an arrangement between one object and another whereby an electrical current can pass there between directly or indirectly.

Figure 1:
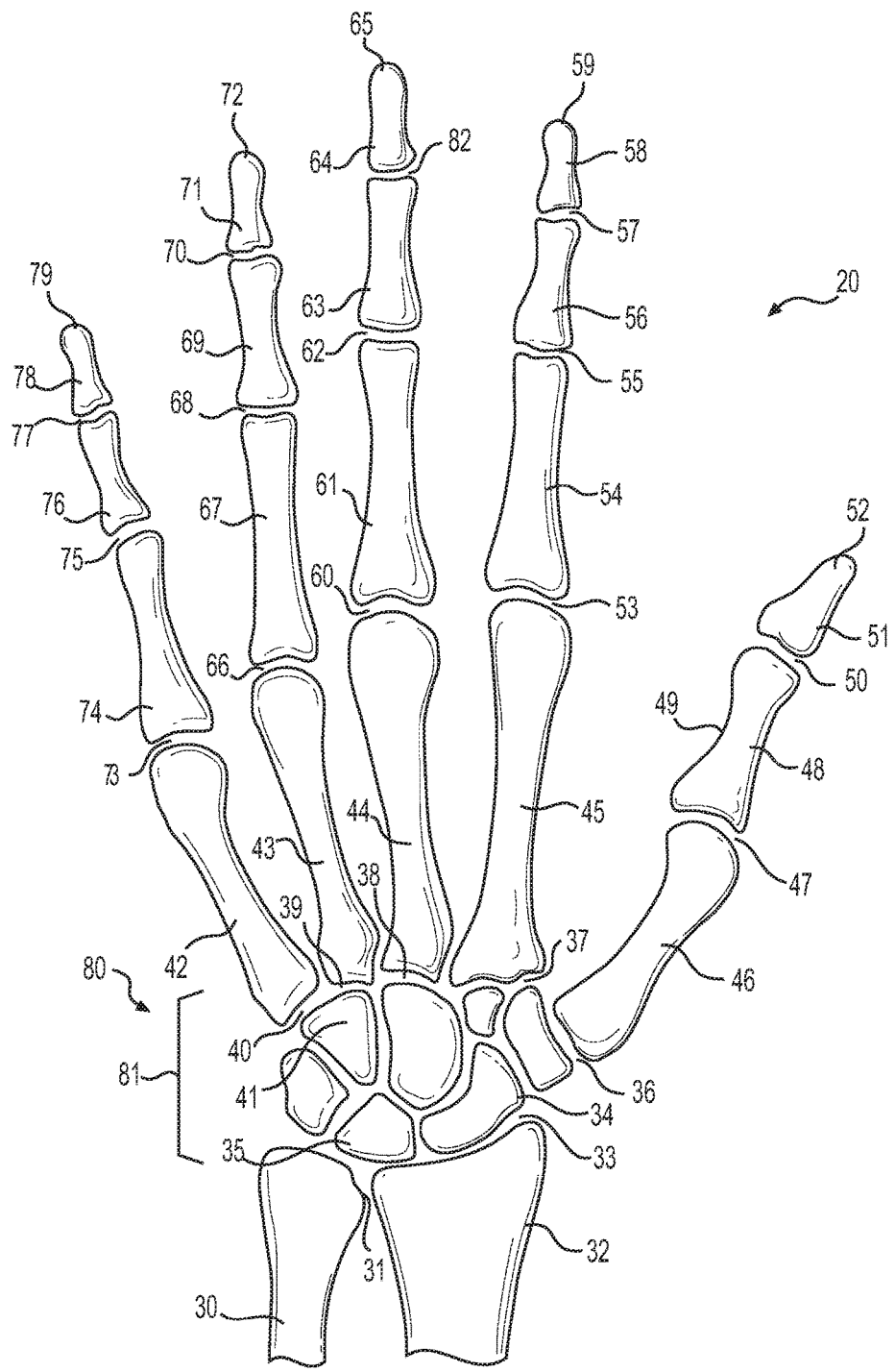
FIG. 1 is a front elevation palm-side schematic anatomical view of the bones of a right-side human hand.

FIG. 1 is a palm side schematic anatomical view of the bones of a right side human hand 20 and a portion of the forearm. The ulna 30 is shown adjacent the radius 32 and the distal radio ulnar joint (DNUJ) 31 there between. The wrist 81 extends therefrom separated by the radiocarpal joint (RC) 38. The carpus 80 includes the lunate 35, the scaphoid 34, and the hamate bone 41, with the carpometacarpal joints (CMC) 36 and 37 separating the metacarpals 46 and 45, respectively, from the wrist 81. The radiocarpal joint (RC) 38 and the carpometacarpal joints (CMC) 39 and 40 are disposed within the wrist 81 adjacent the metacarpals 44, 43, and 42, respectively.

The thumb 52 includes the metacarpal 46, the metacarpalphalangeal joint (MCP) 47, the proximal phalanx 48, the interphalangeal joint (IP) 50, and the distal phalanx 51.

The index finger 59 comprises the metacarpal 45, the metacarpalphalangeal joint (MCP) 53, the proximal phalanx 54, the proximal interphalangeal joint (IP) 55, the middle phalanx 56, and the distal interphalangeal joint (IP) 57, and distal phalanx 58.

The long finger 65 includes the metacarpal 44, the metacarpalphalangeal joint (MCP) 60, the proximal phalanx 61, the proximal interphalangeal joint (IP) 62, the middle phalanx 63, and the distal interphalangeal joint (IP) 82, and distal phalanx 64.

The ring finger 72 comprises the metacarpal 43, the metacarpalphalangeal joint (MCP) 66, the proximal phalanx 67, the proximal interphalangeal joint (IP) 68, the middle phalanx 69, and the distal interphalangeal joint (IP) 70, and distal phalanx 71.

The small finger 79 comprises the metacarpal 42, the metacarpalphalangeal joint (MCP) 73, the proximal phalanx 74, the proximal interphalangeal joint (IP) 75, the middle phalanx 76, and the distal interphalangeal joint (IP) 77, and distal phalanx 78.

Figure 2:
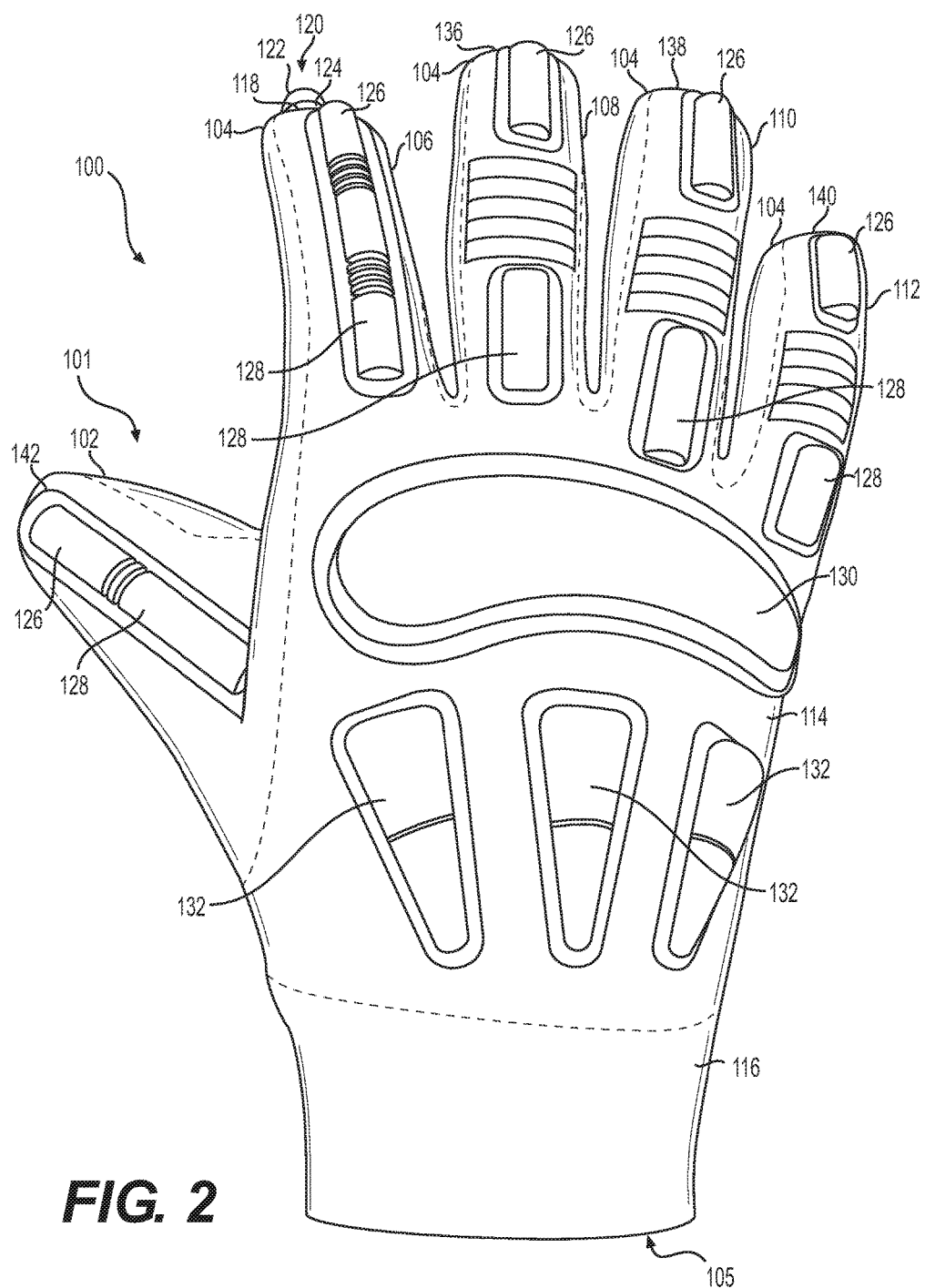
FIG. 2 is a dorsal side view of a protective glove encompassing aspects of the present disclosure.

FIGS. 2-7 and 9 illustrate an embodiment of a protective glove 100 encompassing aspects of the present disclosure. The protective gloves of the present disclosure can be provided for a left, a right or both human hands and, optionally, can be configured to receive hands of a predetermined size. A protective glove for a left hand comprises symmetrically corresponding number and arrangement of elements, materials of construction, and configuration and thicknesses of the elements set forth herein. FIG. 2 illustrates details of the dorsal side of the protective glove 100. As shown in FIG. 2, the protective glove 100 comprises glove body 101 comprising a plurality of finger elements 104, a dorsal portion 114, and a palmar portion 134. The dorsal portion 114 and the palmar portion 134 are either integrally formed or joined together along the respective edges thereof to form the glove body 101 of the glove 100 with an opening 105 therein to receive a hand. The dorsal portion 114 can cover the dorsal side of a hand and the palmar portion 134 can cover the palmar side of a hand disposed in the protective glove 100. The plurality of finger elements 104 can comprise a thumb element 102, an index finger element 106, a long finger element 108, a ring finger element 110, and/or a small finger element 112. Each of the plurality of finger elements 104 can be configured to form a stall for receiving the corresponding finger of a hand 20 disposed within the protective glove 100. The protective glove 100 also includes a cuff 116 that circumscribes the opening 105 of the glove body 101 of the protective glove 100 and can comprise an elastic band that can aid in the retention of the protective glove 100 on a hand 20 on which the glove is disposed.

The finger elements 104 are configured to receive and cover all or a portion of the fingers of a human hand 20 on which the protective glove 100 is disposed. The thumb element 102 can receive and cover a thumb 52; the index finger element 106 can receive and cover an index finger 59; the long finger element 108 can receive and cover a long finger 65; the ring finger element 110 can receive and cover a ring finger 72; and, the small finger element 112 can receive and cover a small finger 79. The thumb element 102 comprises a tip 142; the index finger element 106 comprises a tip 118; the long finger element 108 comprises a tip 136; the ring finger element 110 comprises a tip 138; and, the small finger element 112 comprises a tip 140.

As shown in FIG. 2, the dorsal portion 114 of the glove body 101 of the protective glove 100 comprises one or more protective members disposed thereon and which can project from the surface thereof. A plurality of protective members 132 are disposed on the dorsal portion 114 and aligned so that one or more of the plurality of protective member 132 can protect at least a portion of one or more of the metacarpals 42, 43, 44, and 45 of a hand 20 from cutting and/or crushing forces. A protective member 130 is disposed on the dorsal portion 114 and aligned to protect at least a portion of one or more of the metacarpalphalangeal joints (MCP) 73, 66, 60, and 53 and the adjoining portions of the proximal phalanxes 74, 67, 61, and 54 and/or the metacarpals 42, 43, 44, and 45. One or more protective members 128 are disposed on each of the plurality of finger elements 104 and thumb element 102 and are aligned to protect at least a portion of one of the respective proximal phalanxes 74, 67, 61, and 54. The distal protective members 126 are disposed on each of the plurality of finger elements 104 and thumb element 102 and are aligned to protect at least a portion of one of the respective distal phalanxes 51, 58, 64, 71, and 78. The distal protective members 126 and the protective members 128, 130, and/or 132 can comprise polymeric and/or metallic material. The polymeric material can be elastomeric, such as rubber.

Figure 3:
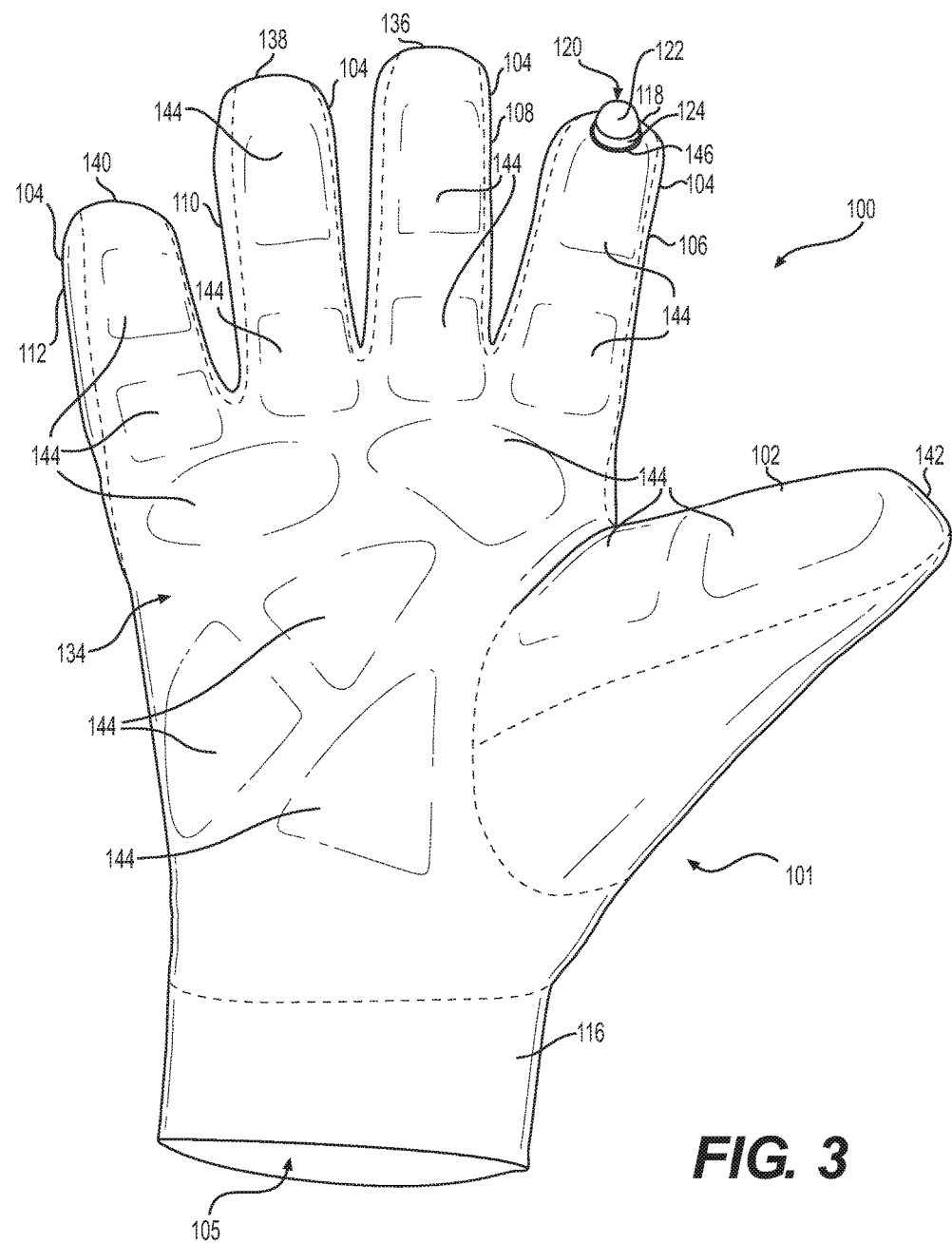
FIG. 3 is a palm side view of the protective glove shown in FIG. 2.

As shown in FIG. 3, the protective glove 100 can comprises a plurality of protective members disposed on the palmar portion 134. The protective members 144 are disposed on each of the plurality of finger elements 104 and the thumb element 102, as well as the palm of the protective glove. The protective members 144 can be aligned on the palmar portion 134 of the protective glove 100 to protect a portion of one or more of the respective distal phalanxes 51, 58, 64, 71, and 78, the middle phalanxes 56, 63, 69, and 76, the proximal phalanxes 48, 54, 61, 67, and 74, and/or the metacarpals 42, 43, 44, 45, and 46. The protective members 144 can be comprise polymeric and/or metallic material. The polymeric material can be elastomeric, such as rubber. The protective members 144 also can comprise fibrous padding attached to or formed in the palmar side of the glove body 101.

The protective glove 100 comprises one or more nibs 120 disposed thereon. As shown in FIG. 3, a nib 120 can be disposed on the palmar side portion 134 of the glove body 101 of the protective glove 100. As shown, the nib 120 is disposed on the index finger element 106 of the protective glove 100 adjacent the tip 118 of the index finger element 106 on the palmar side thereof. The nib 120 projects from the surface of the outer layer 160 of the protective glove 100. The nib 120 comprises a nib body 122, a nib collar 124 circumscribing at least a portion of the nib body 122. The nib 120 is detachably connected to the protective glove 100 by the engagement of a portion of the nib 120 with a nib receiver 146 formed in the protective glove 100. The nib 120, as shown in FIG. 3, comprises a nib body 122 that is at least partially spheroidal in shape. The present disclosure encompasses nibs with alternative configurations.

Figure 4:
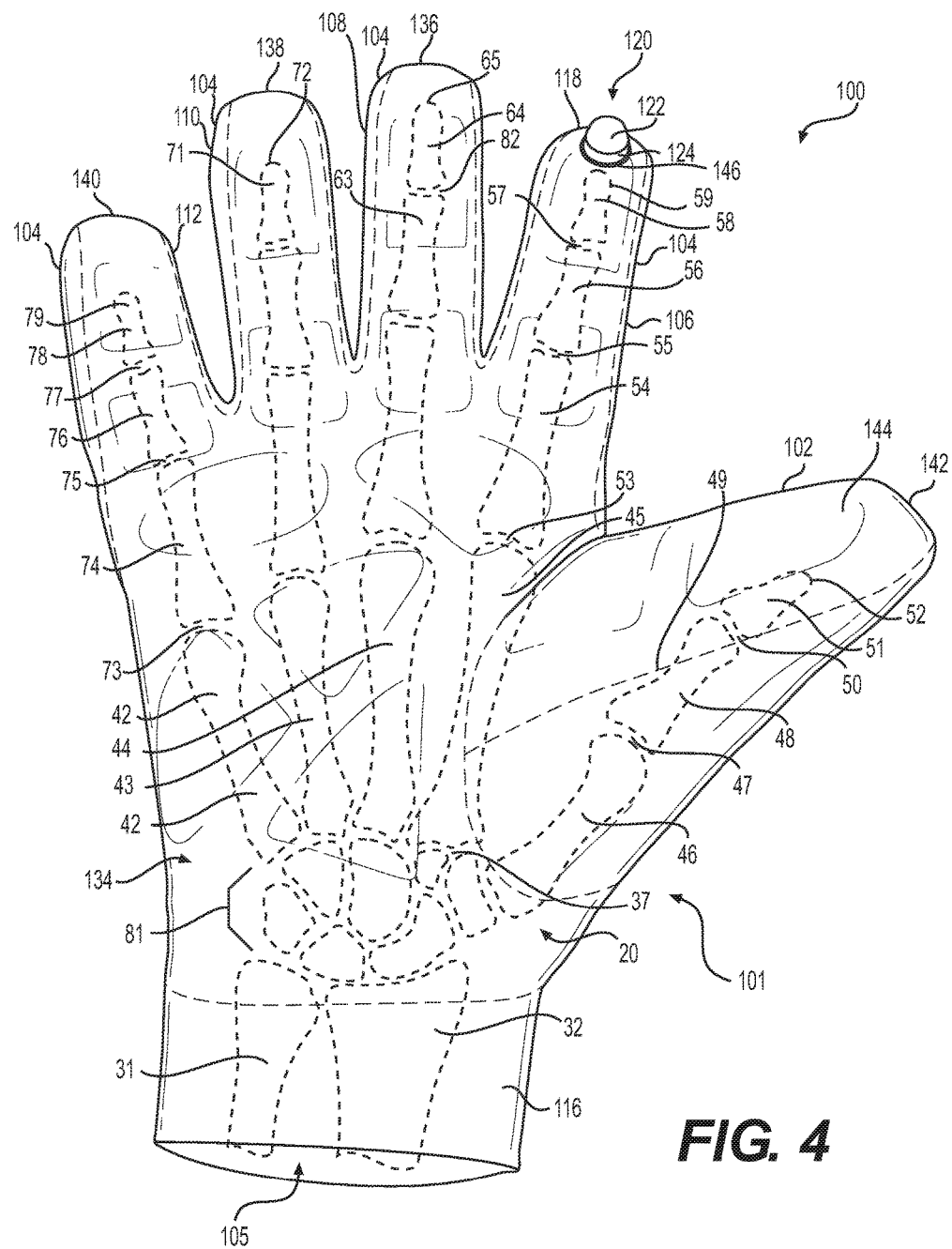
FIG. 4 is another palm side view of the protective glove shown in FIG. 3 and seen overlaying the skeletal structure of a palm-side right-side human hand
Figure 5:
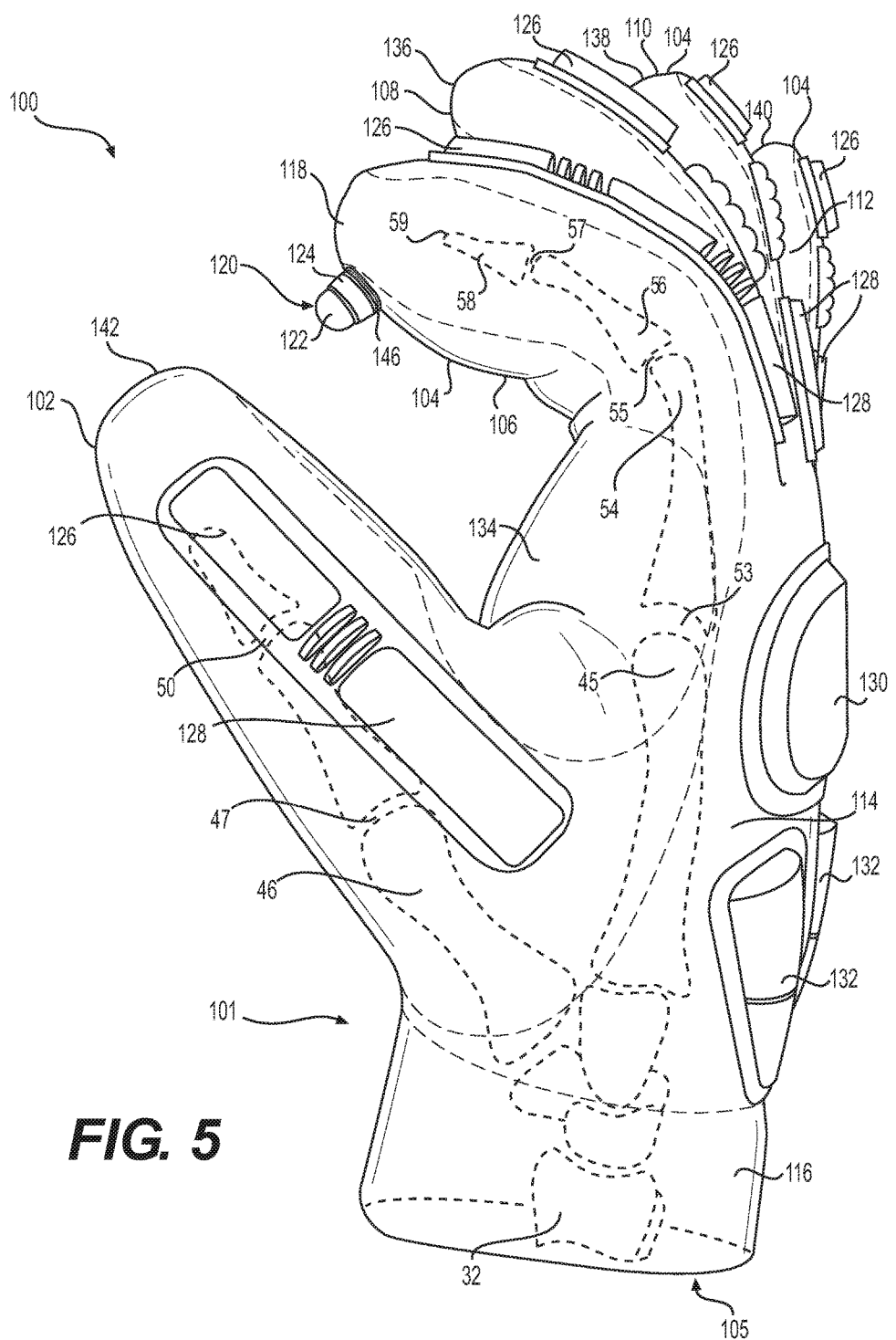
FIG. 5 is a radial side view of the protective glove shown in FIG. 2 in a reconfigured position and seen overlaying the skeletal structure of a right-side human hand.

As shown in FIG. 4, the nib 120 is aligned adjacent the distal phalanx 58 of the index finger 59 when the user's hand is disposed in the protective glove 100. The nib 120 is extends from the outer surface 160 of the protective glove 100 on the palmar side of the index finger element 106. The nib 120 can be aligned to the palmar side of the tip 118 of the index finger element 106.

Figure 6:
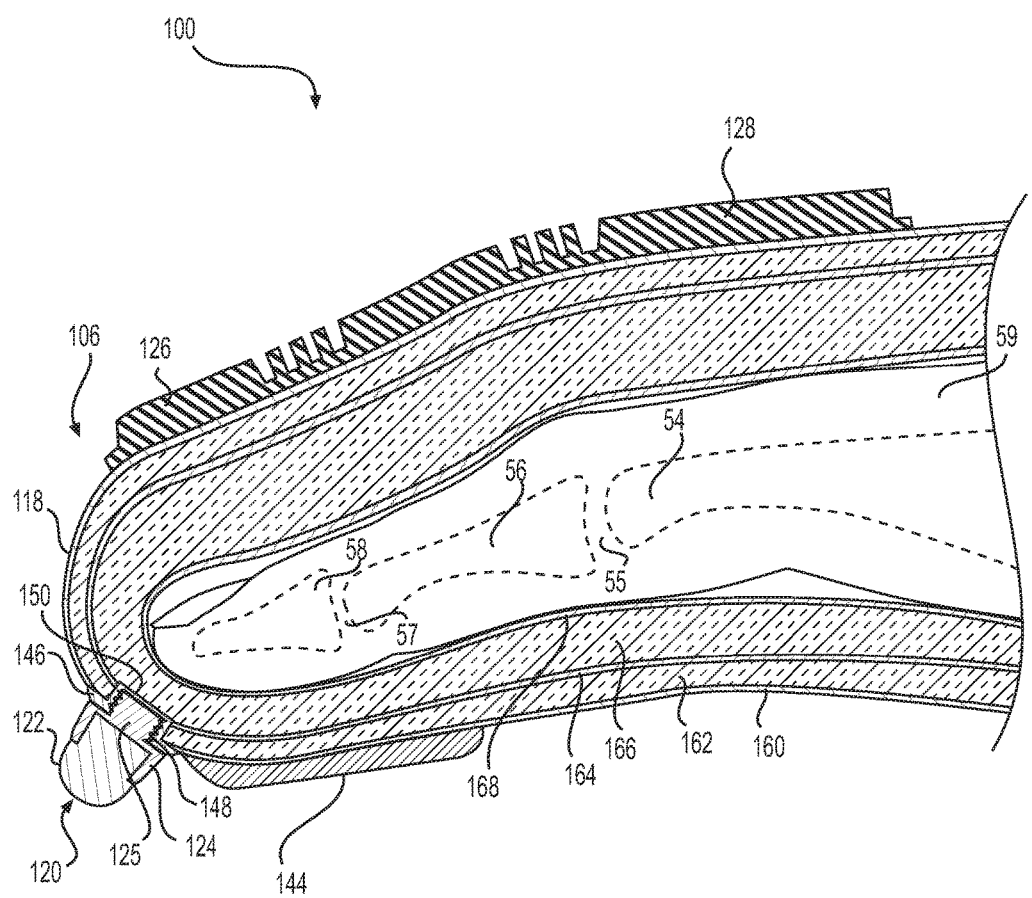
FIG. 6 is a sectional view of the index finger of the protective glove shown in FIG. 4.
Figure 7:
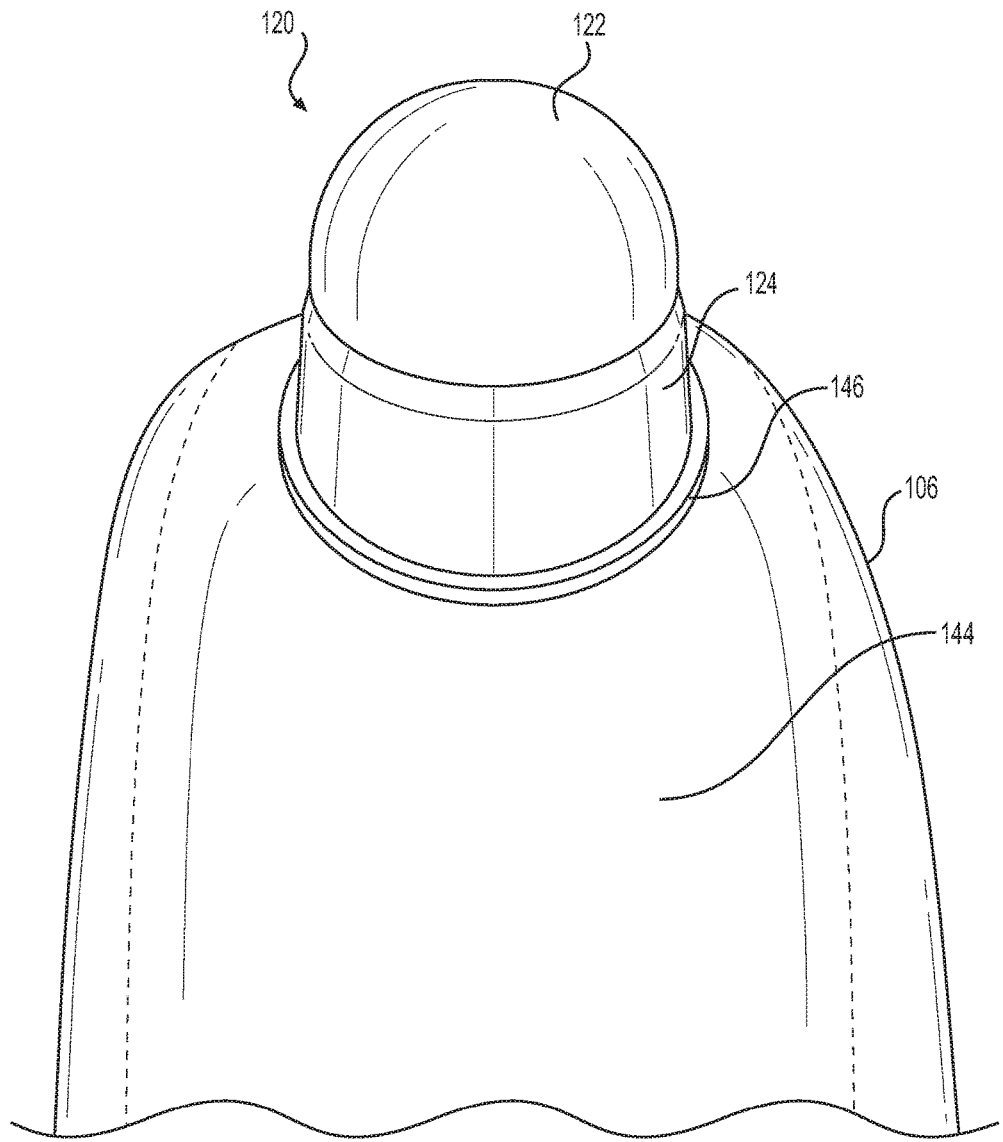
FIG. 7 is a palm side view of the index finger element and nib of the protective glove shown in FIG. 3.

A sectional view of a portion of the index finger element 106 of the protective glove 100 is shown in FIG. 6. The index finger element 106 comprises an outer layer 160, an outer insulation layer 162 disposed adjacent the outer layer 160, an outer fleece layer 164 disposed adjacent the outer insulation layer 162, an inner insulation layer 166 disposed adjacent the outer fleece layer 162, and an inner lining layer 168 disposed adjacent the inner insulation layer 166. One or more of the inner lining layer 168, the inner insulation layer 166, the outer fleece layer 164, and the outer insulation layer 162 can be electrically conductive. The outer layer 160 can be electrically non-conductive. In one aspect, the present disclosure encompasses a protective glove comprising plurality of electrically conductive layers in electrical communication with the nib 120. In another aspect, the present disclosure encompasses a protective glove comprising an insulation layer in electrical communication with an inner lining layer 168, which can be formed of an electrically conductive material provided in a fleece.

As shown in FIG. 6, the nib 120 comprises a nib body 122, a nib collar 124 circumscribing at least a portion of the nib body 122, and a nib post 125. The nib post 125 comprises a thread formed thereon. The nib 120 is detachably connected to the protective glove 100 via retention of the nib 120 by the nib receiver 146. The nib post 125 is threadably connected to the nib receiver 146, which comprises a threaded wall 148 that engages the thread formed on the receiver post 125. The nib receiver 146 also comprises a receiver base 150 that is disposed adjacent the inner insulation layer 166. The nib body 122 is in contact and electrical communication with the nib collar 124 and the nib post 125. The nib post 125 is in contact and electrical communication with the threaded wall 148 and receiver base 150 of the nib receiver 146. The nib receiver 146 is aligned adjacent to and contacting the outer insulation layer 162, the outer fleece layer 164, and the inner insulation layer 166. The nib receiver 146 is in electrical communication with the outer insulation layer 162, the outer fleece layer 164, the inner insulation layer 166, and the inner lining layer 168. Both the nib 120 and the nib receiver 146 are in electrical communication with the index finger 59 of the user wearing the protective glove 100, wherein the electrical communication is provided via the contact of the index finger 59 with the inner lining layer 168, and the electrical communication of the inner lining layer 168 with the inner insulation layer 166, the outer fleece layer 164, the outer insulation layer 162 and the nib receiver 146.

Each of the nib body 122, the nib collar 124 and the nib post 125 can be formed of one or more electrically conductive materials, such as, but not limited to, a polymer, an elastomer, a fluorosilicone or silicone rubber, and/or a polyvinyl chloride, impregnated with one or more electrically conductive particles, including, but not limited to, particles of carbon, silver, copper, aluminum, and/or nickel. The nib body 122 can be disposed within the nib collar 124. The nib collar 124, the nib post 125, and nib receiver 146, which can be formed of a metal, a metal alloy and/or another electrically conductive material, such as, but not limited to, a metal such as, but not limited to, aluminum, steel, brass, and/or nickel.

One or more of the insulation layers and/or fleece layers of the protective gloves encompassed by the present disclosure comprise electrically conductive materials. The electrically conductive materials can comprise electrically conductive metallic fibers, synthetic filaments, synthetic fibers, metallic wire, metallic filament yarn, metallic particles, and/or carbon particles. The electrically conductive materials can comprise metallic fibers, wire, and/or particles including, but not limited to, silver, copper, gold, aluminum, molybdenum, zinc, tungsten, brass, nickel, iron, palladium, platinum, tin, bronze, carbon steel, stainless steel, and/or titanium. The electrically conductive materials also can comprise fibers and/or particles of carbon. The electrically conductive materials can comprise natural and/or synthetic polymeric fibers coated and/or impregnated with metallic and/or carbon particles. The polymeric fibers can include, but are not limited to, cotton, wool, polyester, nylon, aramid, and/or polyoxzole. In one aspect, one or both of the inner lining layer 168 and outer fleece layer 164 comprise a knitted tricot fabric comprising polyester fibers, polyester-polyurethane copolymer (spandex) fibers, and carbon fibers. In a further aspect, one or both of the inner lining layer 168 and outer fleece layer 164 comprise a knitted tricot fabric comprising about 77% by weight polyester fibers, about 3% by weight polyester-polyurethane copolymer fibers, and about 20% by weight carbon fibers. In another aspect, one or both of the outer insulation layer 162 and the inner insulation layer 166 comprise polyester fibers and a metal fibers, including, but not limited to, silver and steel.

Figure 8:
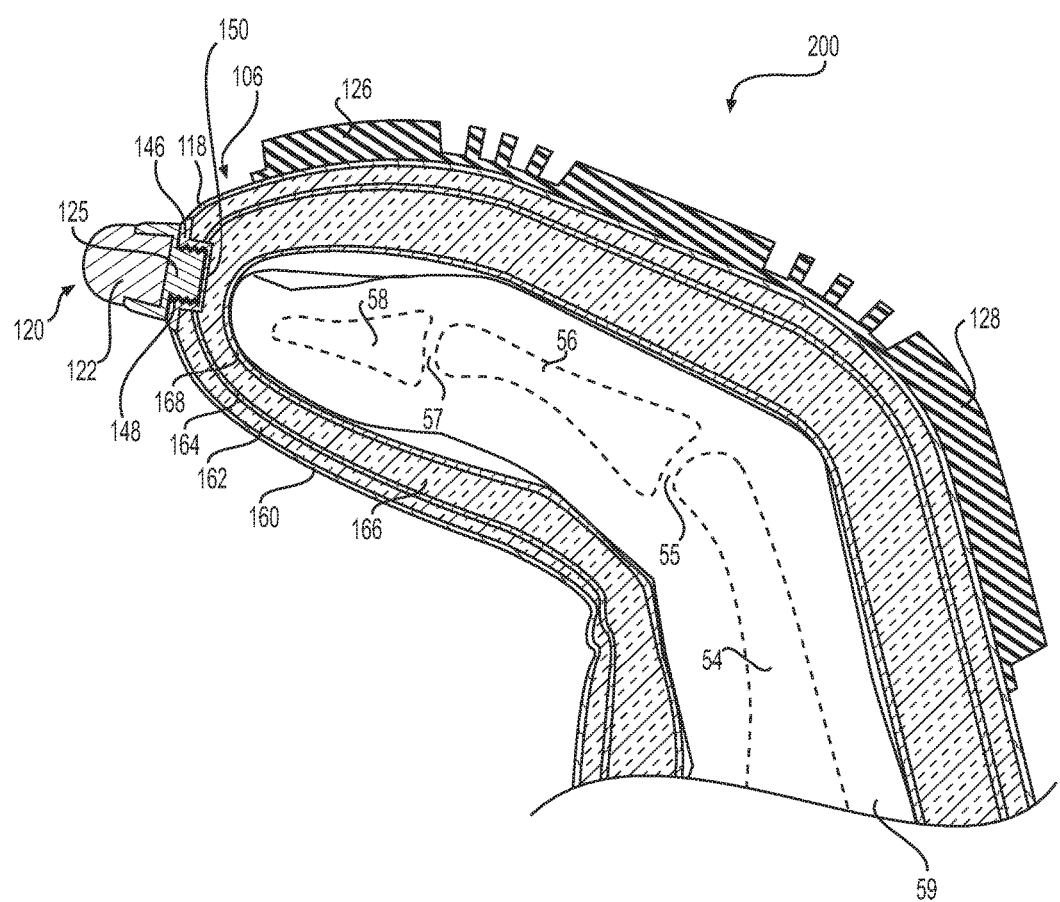
FIG. 8 is a sectional view of the index finger another protective glove encompassing aspects of the present disclosure with the nib and nib receiver aligned on the tip of the index finger element of the protective glove.

FIG. 8 illustrates the index finger element 106 of an alternative protective glove 200 encompassed by the present disclosure. The index finger element 106 is shown in cross section with a user's finger 59 disposed therein, Instead of the nib 420 disposed on the palmar side of the index finger element 106, the protective glove 200 includes a nib 420 disposed at the tip 118 of the index finger element 106 thereof, such that the nib 420 is disposed between the palmar and dorsal side of the protective glove 200. The nib 420 is detachably connected to the protective glove 200 by threadable connection to the nib receiver 146, which is disposed at the tip 118 of the index finger element 106. The position of the nib 420 on the index finger element 106 aligns the nib 420 adjacent the tip of the user's index finger 59 and proximal to the distal phalanx 58 thereof. The index finger 59 of the user is in electrical communication with the nib 420 via the electrical communication of the inner lining layer 168, the inner insulation layer 166, the outer fleece layer 164 and the outer insulation layer 162 with the nib receiver 146.

Figure 9:
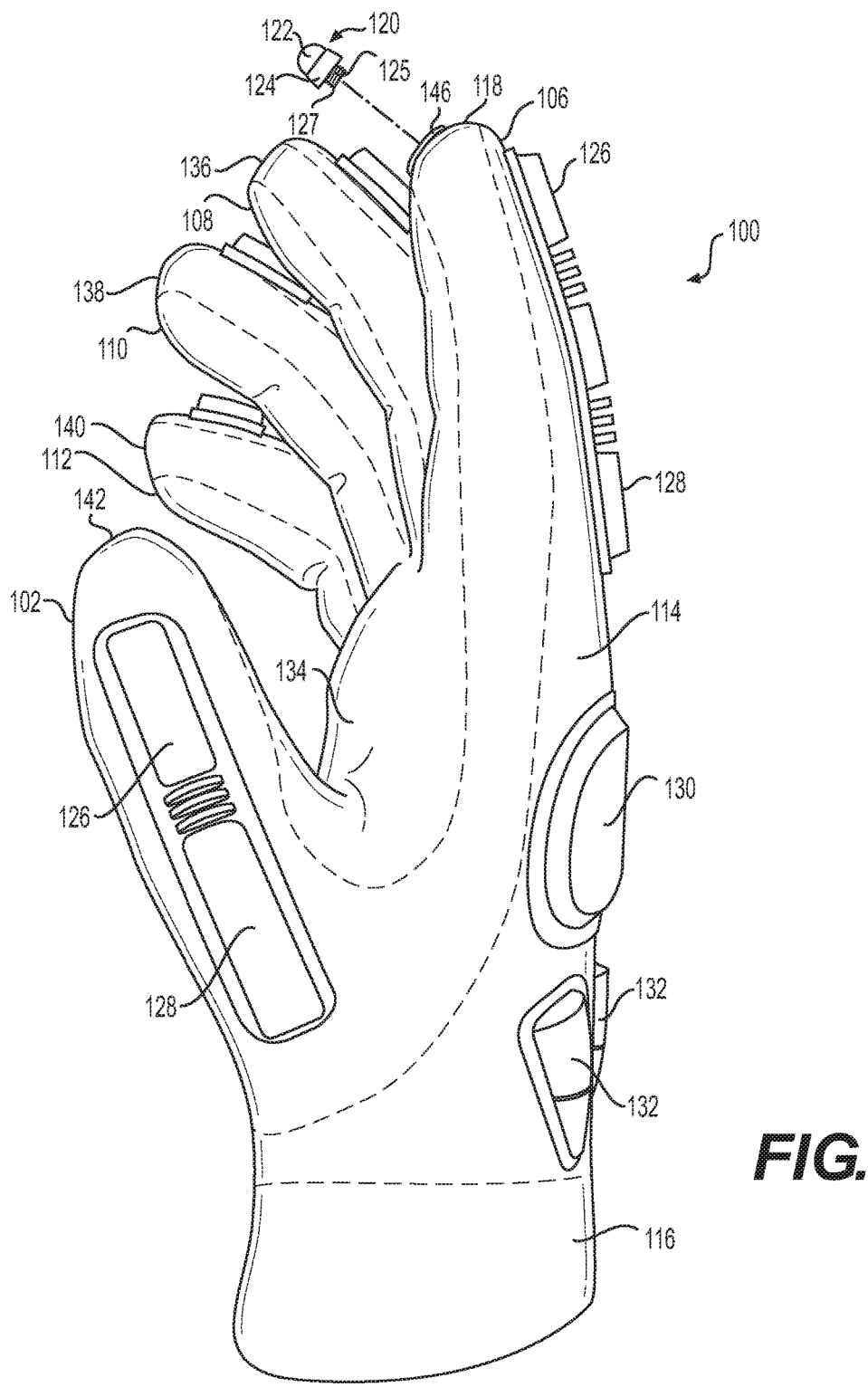
FIG. 9 is a radial view of the protective glove shown in FIG. 3 in a reconfigured alignment and with the nib removed from the index finger element of the protective glove.

FIG. 9 illustrates the nib 120 of the protective glove 100 detached from the nib receiver 146 integrally formed with the protective glove 100. The nib 120 can be detached from the nib receiver 146 to replace the nib 120 or to use the protective glove 100 without the nib 120.

Figure 10:
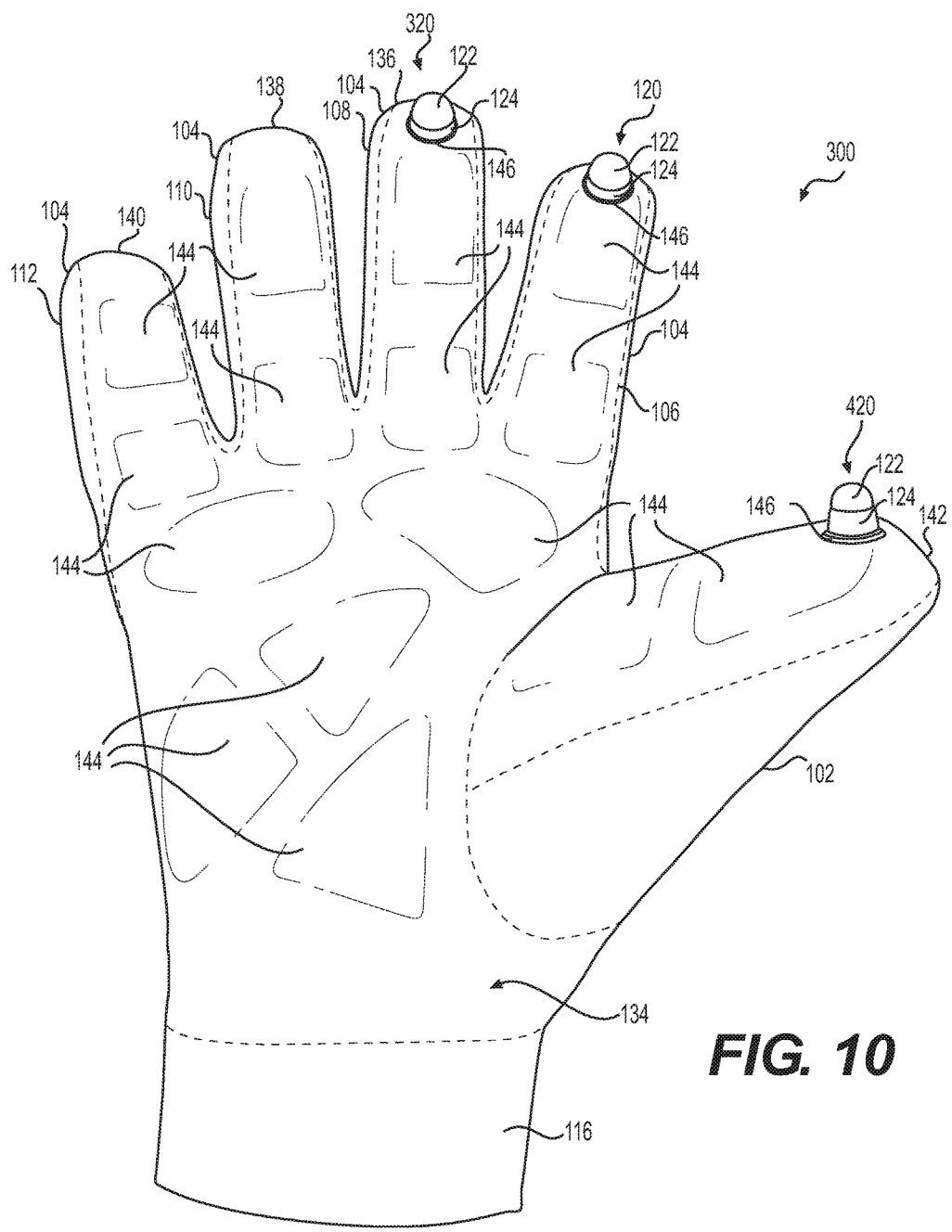
FIG. 10 is a palm side view of a protective glove encompassing aspects of present disclosure and with a plurality of nibs provided thereon.

FIG. 10 illustrates another embodiment of a protective glove 300 encompassed by the present disclosure. The protective glove 300 comprises a plurality of nibs 120, 220, and 320 detachably connected thereto and a plurality of receivers 146 formed therein. As shown in FIG. 10, a single nib receiver 146 is disposed on each of the thumb element 102, the index finger element 106 and the long finger element 108. Each of the three nib receivers 146 has a nib 120, 220, and 320 threadably attached thereto. Each nib 120, 220, and 320 is in electrical communication with the innermost layer of the respective finger element so that a user's finger disposed in the respective finger element 106, 102, and 108 can be electrical communication with the respective nib 120, 220, and 320. The nibs 120, 220, 320 are illustrated disposed on the palmar side of the respective finger elements 106, 201 and 108, but the present disclosure encompasses protective gloves comprising a plurality of nibs disposed at the tips of a plurality of finger elements, as well as other positions on the protective glove appropriate for interaction with a keypad, keyboard, touchscreen, control device or other machine user interface. In one aspect, the protective glove encompassed by the present disclosure comprises a plurality of nib receivers. In another aspect, the plurality of nib receivers comprises a nib receiver on two or more finger elements of the glove. In yet another aspect, at least one nib receiver can be disposed on each of the finger elements so as to allow a nib to be mounted on each of the finger elements. In further aspect, a plurality of nib receivers can be disposed on a finger element of the protective glove.

The protective glove 300 can be used with only one of the nib receivers 146 having a nib 120, 220 or 320, respectively, threadably connected thereto. Alternatively, less than all, but more than one, of the nib receivers 146 can have a nib 120, 220 or 320 threadably connected thereto, so as to expand the configurations of the protective glove 300 as needed in particular applications.

The protective gloves 100, 200, and 300 described herein can be worn by a user and used to interact with a keyboard, keypad, touchscreen or other user interface of a machine or device by contacting the nib 120, 220, 320 and/or 420 to the user interface. If the user interface has a capacitive aspect in which activation of the interface is carried out by completing an electrical circuit between the interface and a part of the user's body, an electrical circuit can be completed between the user's hand and the user interface through the nib body 122, the nib post 125, the nib receiver 146, and one or more of the outer insulation layer 162, the outer fleece layer 164, the inner insulation layer 166, and the inner lining layer 168, which is in contact with at least a portion of the user's hand 20 disposed within the protective glove 100, 200, or 300. The alignment of the nibs 120, 220, and 320 on one of the finger elements 104 of the protective gloves 120, 220, and 320 allows the user to apply pressure to the respective nib by the finger upon which the respective nib is positioned. The plurality of insulative layers provided in each of the protective gloves 120, 220, and 320 can protect the user's hand from extreme temperature and other environmental conditions as the nibs disposed on the protective gloves are being used on a user interface. The protective members 126, 128, 130 and 132 can assist in the protection of the user's hand from vibration and/or crushing forces.

The alignments and configurations of the parts of the protective glove disclosed herein can be varied without departing from the scope of the present disclosure. Other embodiments of protective gloves set forth in the present disclosure will be apparent to those skilled in the art from their consideration of the specification and practice of the present disclosure disclosed in this document. The applicant intends that the specification and examples be considered as exemplary only, with the true scope and spirit of the present disclosure.

The invention claimed is:

1. A protective glove comprising:
a palmar portion and a dorsal portion connected to the palmar portion, wherein the palmar portion and the dorsal portion cooperate to form a glove body, wherein the palmar portion and the dorsal portion cooperate to form an opening in the glove body;
a plurality of finger elements formed in the glove body, wherein the plurality of finger elements comprises an index finger element, a long finger element, a ring finger element, and a small finger element;
a thumb element formed in the glove body, wherein the glove body comprises an outer layer, an inner lining layer, and an insulative layer disposed between the outer layer and the inner lining layer; and,
a nib attached to the glove body, wherein the nib comprises an electrically conductive material, wherein the outer layer is electrically non-conductive, wherein the inner lining layer is electrically conductive, and wherein the nib is in electrical communication with the inner lining layer.

2. The protective glove of claim 1, further comprising a nib receiver attached to the glove body, wherein the nib is detachably secured to the nib receiver.

3. The protective glove of claim 1, wherein the insulative layer is electrically conductive, and wherein the insulative layer is in electrical communication with the nib and the inner lining layer.

4. The protective glove of claim 1, wherein the insulative layer is one insulative layer of a plurality of insulative layers disposed in the glove body between the outer layer and the inner lining layer.

5. The protective glove of claim 1, further comprising a plurality of protective members disposed on the glove body.

6. The protective glove of claim 5, wherein a protective member of the plurality of protective members is disposed on the dorsal portion.

7. The protective glove of claim 5, wherein the plurality of protective members is disposed on the plurality of finger elements.

8. The protective glove of claim 1, wherein the nib is disposed on the index finger element of the glove body.

9. The protective glove of claim 8, wherein the nib is disposed on a palmar side of the index finger element of the glove body.

10. The protective glove of claim 1, further comprising a plurality of nib receivers attached to the glove body.

11. The protective glove of claim 10, wherein the plurality of nib receivers is disposed on the plurality of finger elements.

12. A protective glove comprising:
a palmar portion and a dorsal portion connected to the palmar portion, wherein the palmar portion and the dorsal portion cooperate to form a glove body, wherein the palmar portion and the dorsal portion cooperate to form an opening in the glove body;
a plurality of finger elements formed in the glove body, wherein the plurality of finger elements comprises an index finger element, a long finger element, a ring finger element, and a small finger element;
a thumb element formed in the glove body, wherein the glove body comprises an outer layer, an inner lining layer, and a plurality of insulative layers disposed between the outer layer and the inner lining layer; and,
a nib detachably connected to a nib receiver, wherein the nib receiver is attached to the glove body, wherein the nib comprises an electrically conductive material, wherein the outer layer is electrically non-conductive, wherein the inner lining layer is electrically conductive, and wherein the nib is in electrical communication with the inner lining layer.

13. The protective glove of claim 12, wherein the plurality of insulative layers is electrically conductive, and wherein the plurality of insulative layers is in electrical communication with the nib and the inner lining layer.

14. The protective glove of claim 12, further comprising a plurality of protective members disposed on the dorsal portion of the glove body.

15. The protective glove of claim 12, further comprising a plurality of protective members disposed on the plurality of finger elements.

16. The protective glove of claim 12, wherein the nib is disposed on the index finger element of the glove body.

17. The protective glove of claim 16, wherein the nib is disposed on a palmar side of the index finger element of the glove body.

18. The protective glove of claim 12, wherein the nib receiver is one nib receiver of a plurality of nib receivers attached to the glove body.

19. A protective glove comprising:
a palmar portion and a dorsal portion connected to the palmar portion, wherein the palmar portion and the dorsal portion cooperate to form a glove body, wherein the palmar portion and the dorsal portion cooperate to form an opening in the glove body;
a plurality of finger elements formed in the glove body, wherein the plurality of finger elements comprises an index finger element, a long finger element, a ring finger element, and a small finger element;

a thumb element formed in the glove body, wherein the glove body comprises an outer layer, an inner lining layer, an outer insulative layer disposed adjacent the outer layer, an outer fleece layer disposed adjacent the outer insulative layer, and an inner insulative layer disposed between the outer fleece layer and the inner lining layer, wherein at least one of the outer insulative layer, the outer fleece layer, and the inner insulative layer are electrically conductive;

a plurality of protective members disposed on the dorsal portion and the plurality of finger elements and the thumb element; and, a nib detachably connected to a nib receiver, wherein the nib receiver is attached to the palmar side of the index finger element of the glove body, wherein the nib extends beyond the outer layer, wherein the nib comprises an electrically conductive material, wherein the outer layer is electrically non-conductive, wherein the inner lining layer is electrically conductive, wherein the nib is in electrical communication with the inner lining layer, and at least one of the outer insulative layer, the outer fleece layer, and the inner insulative layer.

* * * * *